(12) United States Patent
Hoshino et al.

(10) Patent No.: US 8,674,849 B2
(45) Date of Patent: Mar. 18, 2014

(54) INFORMATION DISPLAY TERMINAL

(75) Inventors: Takeshi Hoshino, Kodaira (JP); Youichi Horii, Mitaka (JP); Tadaaki Ishikawa, Tuchiura (JP); Yukiko Ichige, Tokyo (JP); Hiroki Sato, Shiki (JP)

(73) Assignee: Hitachi, Ltd., Tokyo (JP)

( * ) Notice: Subject to any disclaimer, the term of this patent is extended or adjusted under 35 U.S.C. 154(b) by 4 days.

(21) Appl. No.: 13/397,065

(22) Filed: Feb. 15, 2012

(65) Prior Publication Data

US 2012/0253672 A1 Oct. 4, 2012

(30) Foreign Application Priority Data

Mar. 31, 2011 (JP) ................................ 2011-079320

(51) Int. Cl.
*G01C 21/00* (2006.01)
*G09F 9/00* (2006.01)
*G08G 1/09* (2006.01)

(52) U.S. Cl.
CPC . *G01C 21/00* (2013.01); *G09F 9/00* (2013.01); *G08G 1/09* (2013.01)
USPC ........... 340/944; 340/907; 340/925; 701/400; 701/541; 345/473

(58) Field of Classification Search
USPC .......... 701/400, 541; 340/925, 944, 953, 907; 359/13; 345/473–475; 348/113
See application file for complete search history.

(56) References Cited

U.S. PATENT DOCUMENTS

| | | | | |
|---|---|---|---|---|
| 5,754,189 A | * | 5/1998 | Doi et al. | 345/473 |
| 6,006,161 A | * | 12/1999 | Katou | 701/410 |
| RE36,930 E | * | 10/2000 | Houten et al. | 340/944 |
| 7,855,660 B2 | * | 12/2010 | Kim et al. | 340/925 |
| 2005/0212822 A1 | * | 9/2005 | Honma et al. | 345/649 |
| 2008/0272936 A1 | * | 11/2008 | Kim et al. | 340/929 |
| 2011/0140923 A1 | * | 6/2011 | Keller | 340/944 |
| 2011/0298808 A1 | * | 12/2011 | Rovik | 345/473 |
| 2012/0095678 A1 | * | 4/2012 | Moore et al. | 701/434 |
| 2013/0135479 A1 | * | 5/2013 | Bregman-Amitai et al. | 348/158 |
| 2013/0245942 A1 | * | 9/2013 | Ure | 701/533 |

FOREIGN PATENT DOCUMENTS

JP 2007-248279 9/2007
JP 2007-249095 9/2007

* cited by examiner

*Primary Examiner* — Thomas Tarcza
*Assistant Examiner* — Tyler J Lee
(74) *Attorney, Agent, or Firm* — Antonelli, Terry, Stout & Kraus, LLP.

(57) ABSTRACT

An information display terminal allows a user to grasp rapidly and surely the direction to a destination, and can guide the user to the destination without placing a burden on the user. The information display terminal is provided at a passage, and its display screen displays a route guidance screen that guides a route to the destination. The route guidance screen displays a pseudo-action image that shows the walking motion, and a destination display information image indicating a destination name such as "Subway Ticket Gate". The action image shows the motion of walking toward the destination, but the display position does not change. The destination display information image is displayed in front of the action image in the advancing direction.

15 Claims, 14 Drawing Sheets

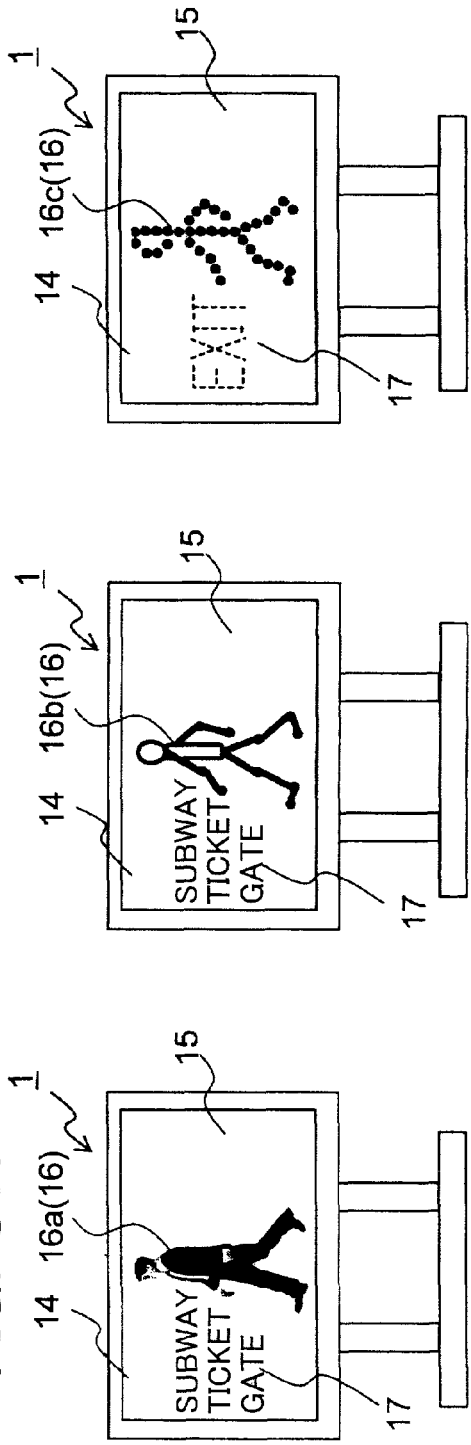
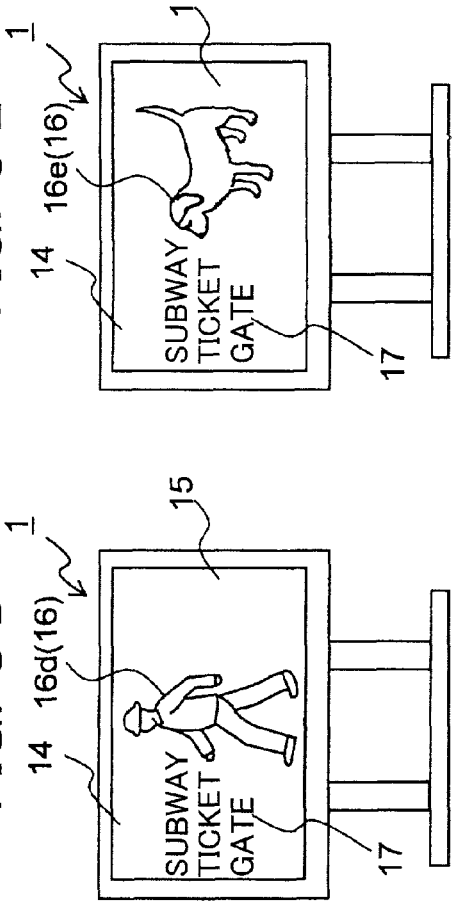

FIG. 6 A
FIG. 6 B
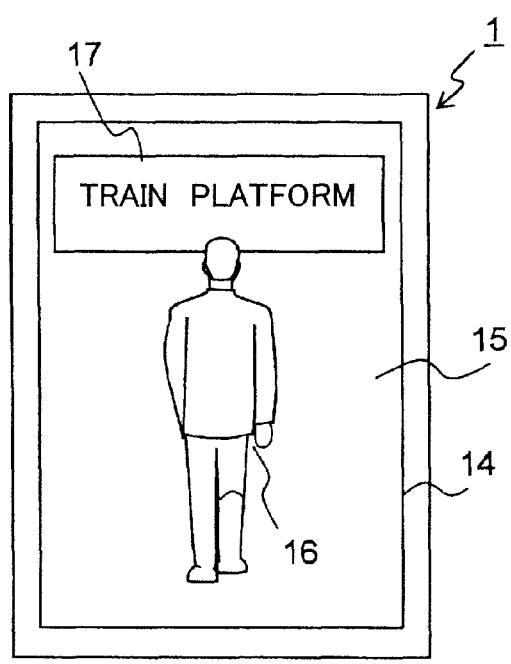
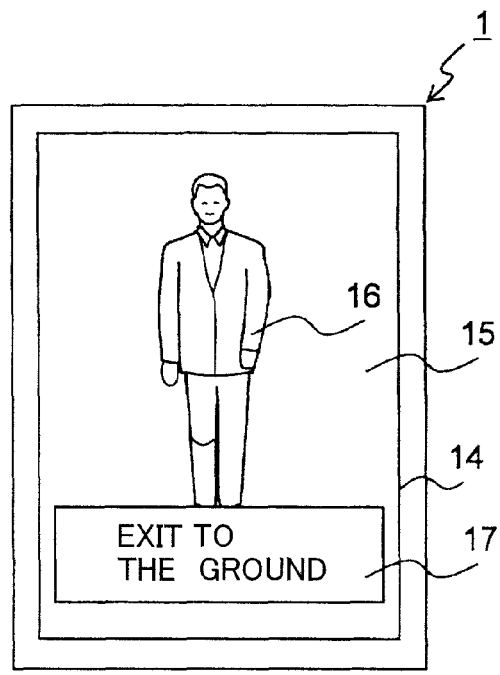

FIG. 10 A
FIG. 10 B
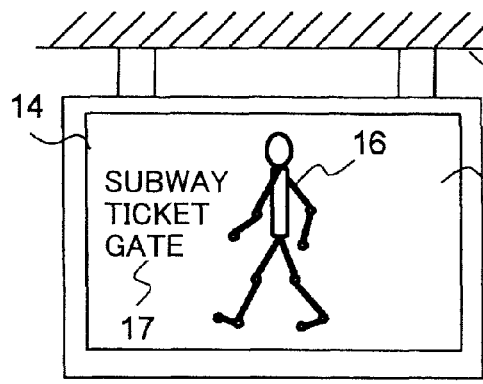
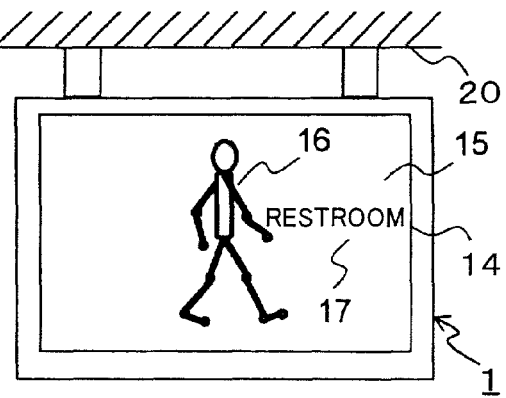
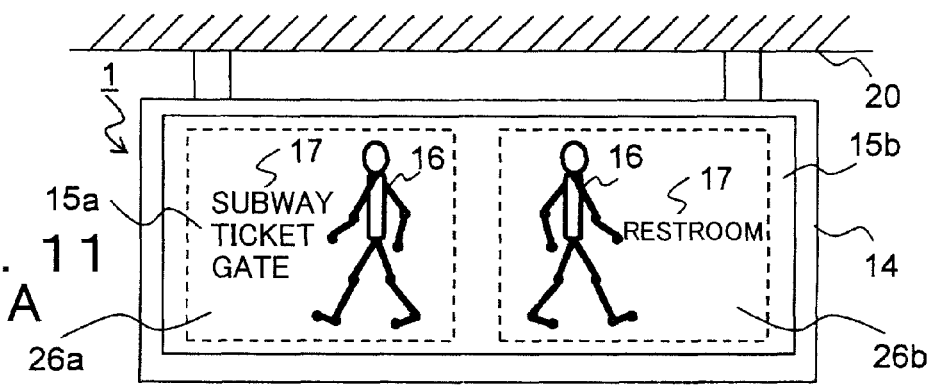
FIG. 11 A
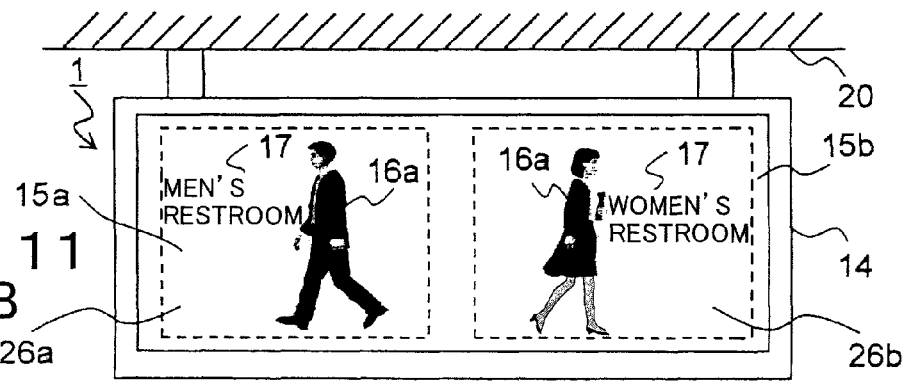
FIG. 11 B

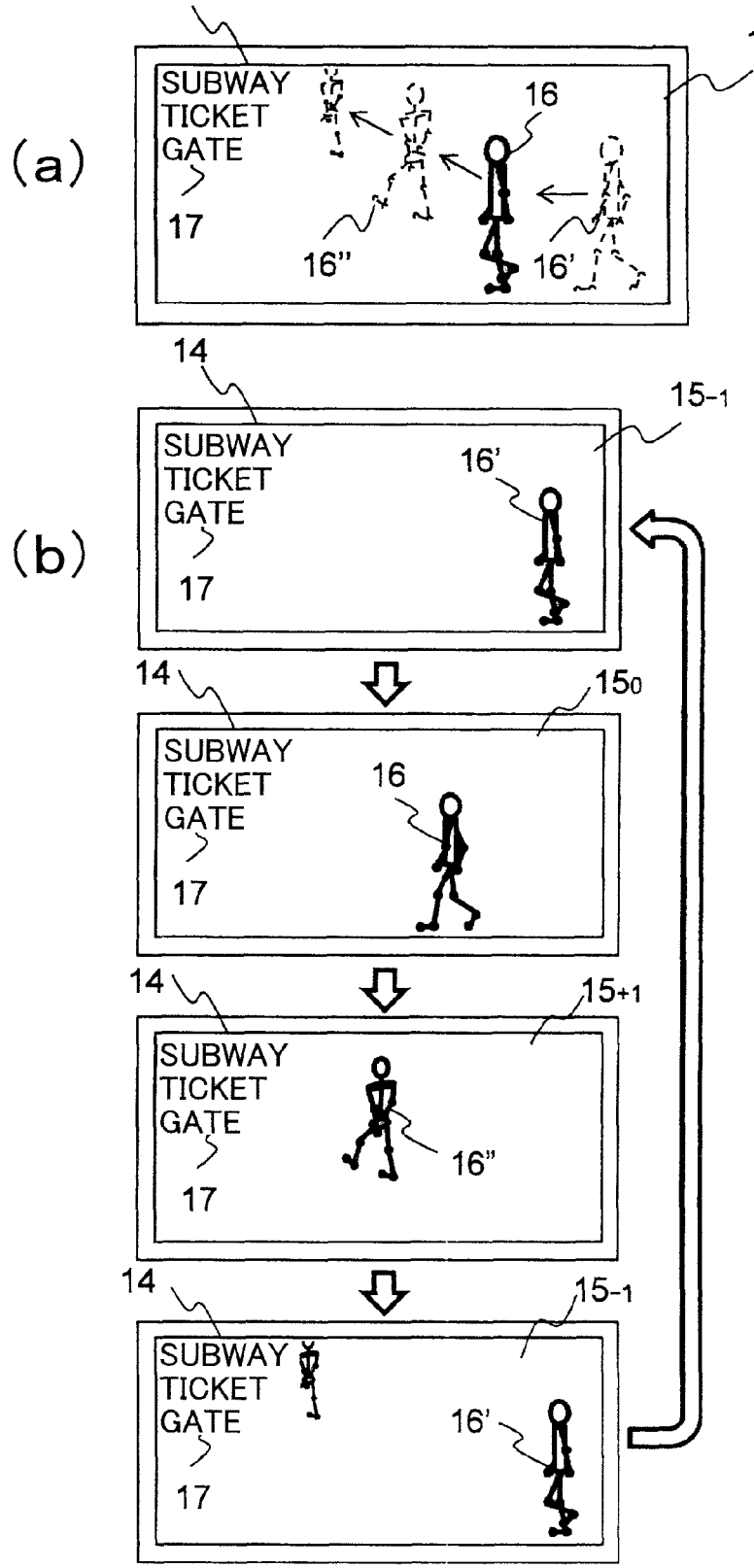

INFORMATION DISPLAY TERMINAL

CLAIM OF PRIORITY

The present application claims priority from Japanese patent application JP 2011-079320 filed on Mar. 31, 2011, the content of which is hereby incorporated by reference in this application.

BACKGROUND OF THE INVENTION

1) Field of the Invention

The present invention relates to an information display terminal that displays guidance to a destination.

2) Description of the Related Art

In a construction such as a station yard and a department store where a plurality of facilities (e.g. doorway, ticket gate, elevator, and restroom) are present, a guidance terminal (sign terminal) that displays guidance to a target facility is installed at places for guiding a user to the facilities. Such a guidance terminal displays an arrow that indicates the direction to a target facility from the position where the guidance terminal is installed, and texts that indicate the name of the facility. When a user goes to a place where he/she wants to go (target facility) from where he/she is, the user can confirm the direction to the target facility that he/she should advance to by looking at contents displayed on the guidance terminal that guides to the target facility.

When the guidance terminal shows an arrow indicating the direction to the target facility, the arrow represents the direction that the user should advance to from the current position. However, the user may not be able to grasp the direction clearly by looking at the arrow depending on the direction to the target facility because the arrow is displayed two-dimensionally. For example, when the arrow points at a horizontal direction, the user may interpret that the direction to the target facility is to the right or left of him/her at the current position or that he/she should turn right or left after advancing several steps. When an arrow points upward obliquely, the user may interpret that if he/she advances several steps, there is a passage that extends obliquely, and he/she should advance along the passage, or that if he/she advances several steps, there are stairs, and he/she should go up them.

Japanese Patent Application Laid-Open No. 2007-249095 discloses a technique of displaying icons to indicate facilities.

According to the technique of Japanese Patent Application Laid-Open No. 2007-249095, icons of motion images are displayed as guidance to facilities such as an escalator, a moving sidewalk, and a taxi stand. For example, in case of an ascending escalator, an icon at the entrance of the escalator displays an animation of a motion image showing a person entering the entrance, getting on the escalator, going up on the escalator, and exiting from the exit upstairs. This technique enables a user at the entrance of the escalator to recognize the direction of the ascending motion of the escalator.

In another example, Japanese Patent Application Laid-Open No. 2007-248279 discloses a technique of guiding to a destination using a touch panel that displays a guidance map to a destination and a display that displays a landscape image of the guidance route to the destination.

According to the technique of Japanese Patent Application Laid-Open No. 2007-248279, when a user operates the touch panel to specify a destination, the touch panel displays a guidance map that shows the guidance route to the destination, and along with it, the display displays a landscape image of the route to the destination. The user advances along the guidance route memorizing the landscaping image, and compares the memorized landscape image with the landscape that he/she actually sees; thereby, the user can avoid going off the guidance route.

According to the technique of Japanese Patent Application Laid-Open No. 2007-249095, operations of facilities such as an escalator, a moving sidewalk, and a taxi stand are shown to make it easy for a user to use the facilities. In this case, a state of a user using a facility is displayed on an icon; therefore, the user can understand how to use the facility.

However, the technique of Japanese Patent Application Laid-Open No. 2007-249095 does not guide the route to the facility. The position of the facility is shown on a guidance map, and a user has to judge the direction and the route to the destination by looking at the guidance map.

According to the technique of Japanese Patent Application Laid-Open No. 2007-248279, a landscape image of the route to the destination is displayed, and it becomes possible to judge whether a user is on the right route to the destination based on the landscape image. This requires a user to memorize the landscape image of the route displayed on the display accurately, and to memorize the route displayed on the touch panel. Thus, a user has to memorize a large amount of information, and this places a much burden on him/her.

An object of the present invention is to solve the problems, and provide an information display terminal that enables a user to grasp the direction to a destination rapidly and surely, and can guide him/her to the destination without placing a burden on the user.

SUMMARY OF THE INVENTION

To attain the object, an information display terminal according to an aspect of the present invention has a display screen that displays a route guidance screen for guiding a route to a destination, wherein the route guidance screen displays an action image showing the motion of walking in a direction to the destination, and a destination display information image that represents a destination name, and the destination display information image is displayed in a front area of the action image in the walking direction of the action image.

According to another aspect of the present invention, the action image shows the motion of walking at a constant display position on the display screen.

According to another aspect of the present invention, the route guidance screen shows a state as if the action image looks up or down according to a height of the display screen.

According to another aspect of the present invention, the route guidance screen displays the action image walking along a passage, and the passage is displayed to move in an opposite direction to the walking direction of the action image.

According to another aspect of the present invention, the display screen displays a plurality of the route guidance screens that are different for different guidance destinations in an order repeatedly every predetermined time.

According to another aspect of the present invention, the display screen displays, simultaneously in different areas, a plurality of the route guidance screens that are different for different guidance destinations.

According to another aspect of the present invention, the route guidance screen displays the action image that is a still image at a normal situation, and the action image showing the motion of walking at an abnormal situation.

According to another aspect of the present invention, the action image walks to move toward a display position of the destination display information image on the display screen.

According to another aspect of the present invention, the action image is displayed oriented in different directions according to movement directions.

According to another aspect of the present invention, the action image is displayed to change in size as it moves.

According to another aspect of the present invention, the route guidance screen displays a plurality of the action images walking to move toward a display position of the destination display information image.

According to another aspect of the present invention, the information display terminal is a mobile terminal.

Because the destination display information image showing the name of the destination is displayed in the front area of the action image in the walking direction of the action image, the destination display information image catches eyes of a user, and the user can grasp rapidly and surely the route to the destination guided by the route guidance screen.

BRIEF DESCRIPTION OF THE DRAWINGS

Embodiments of the present invention will be described in detail based on the following drawings, wherein:

FIGS. 3A to 3E are diagrams showing specific examples of route guidance images displayed on the information display terminal shown in FIG. 2;

FIGS. 6A and 6B are diagrams showing other specific examples of route guidance images showing guidance routes to directions different from those shown in the specific examples of FIGS. 3A to 3E, 4A, 4B, and 5;

FIGS. 10A and 10B are diagrams showing still other specific examples of the route guidance screen displayed by the information display terminal shown in FIGS. 1A and 1B;

FIGS. 11A and 11B are diagrams showing still other specific examples of the route guidance screen displayed by the information display terminal shown in FIGS. 1A and 1B;

FIG. 13C is a diagram showing still another example of the route guidance screen displayed on the information display terminal that displays the route guidance screen shown in FIG. 13A;

DETAILED DESCRIPTION OF THE PREFERRED EMBODIMENTS

Concepts of the present invention are explained.

Figure 1:
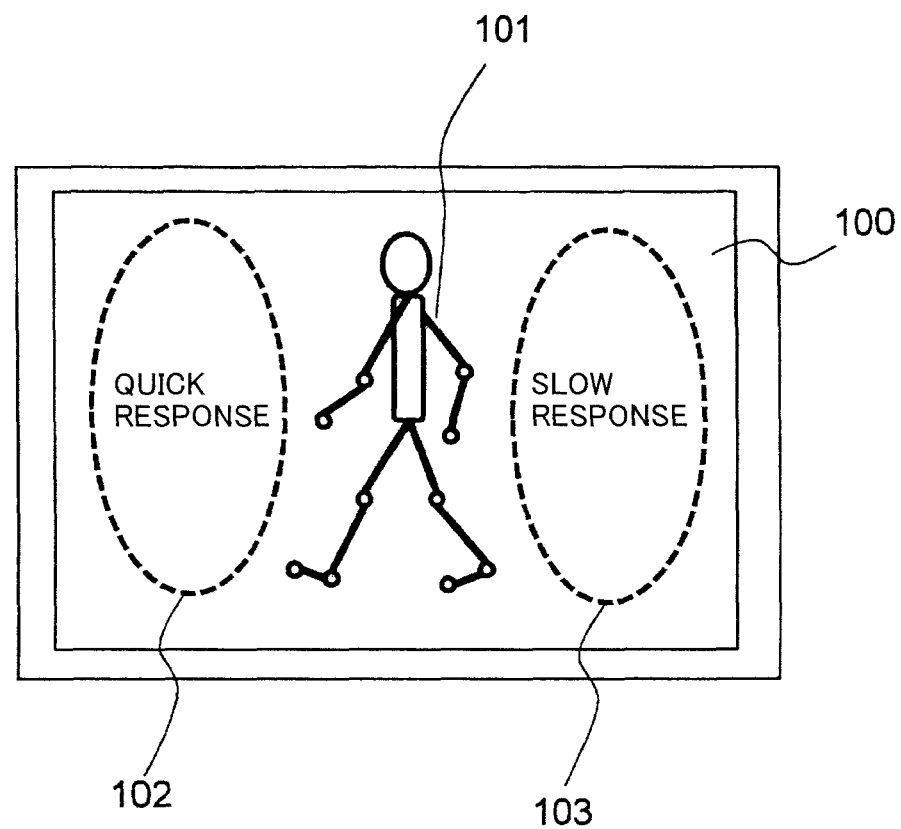
FIGS. 1A and 1B are diagrams showing concepts of a display by an information display terminal according to an embodiment of the present invention.
Figure 1:
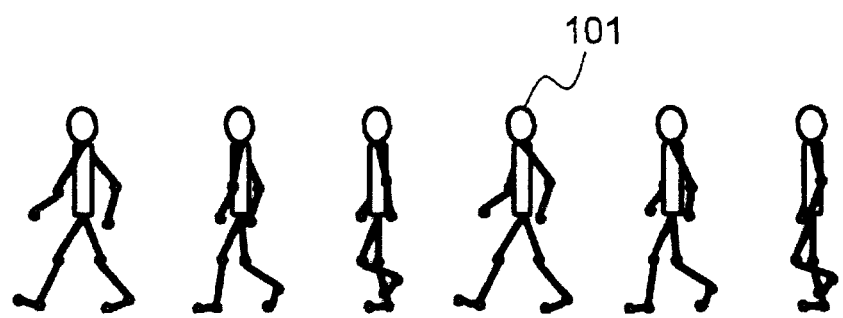

Humans are said to have a nature to imitate behaviors of others. This nature is attributed to mirror neurons. Because of this nature, when a human image 101 that is walking leftward as shown in FIG. 1B is displayed at the center of a display screen 100 shown in FIG. 1A (The human image 101 in FIG. 1A shows the walking motion, but does not move on the display screen 100, and keeps showing the motion of walking leftward at the center of the display screen 100.), a viewer (hereinafter, a user) who looks at this image can understand intuitively and instantly the three-dimensional motion of the human image 101, and recognize the movement direction.

One experiment proved that the user who looks at the image displayed on the display screen 100 is more aware of a region next to the walking human image 101 in the movement direction, that is, a front region 102 of the human image 101 than of a rear region 103 of the human image 101 opposite to the advancing direction. Accordingly, when displaying on the display screen 100 text information such as a destination name (destination display information) for guiding the user, the destination display information displayed in the front region 102 catches eyes of a user more than the destination display information in the rear region 103 does, and the user can grasp and understand more rapidly and accurately the former than the latter.

The present invention has been made based on this concept, and embodiments of the present invention are explained with reference to drawings.

Figure 2:
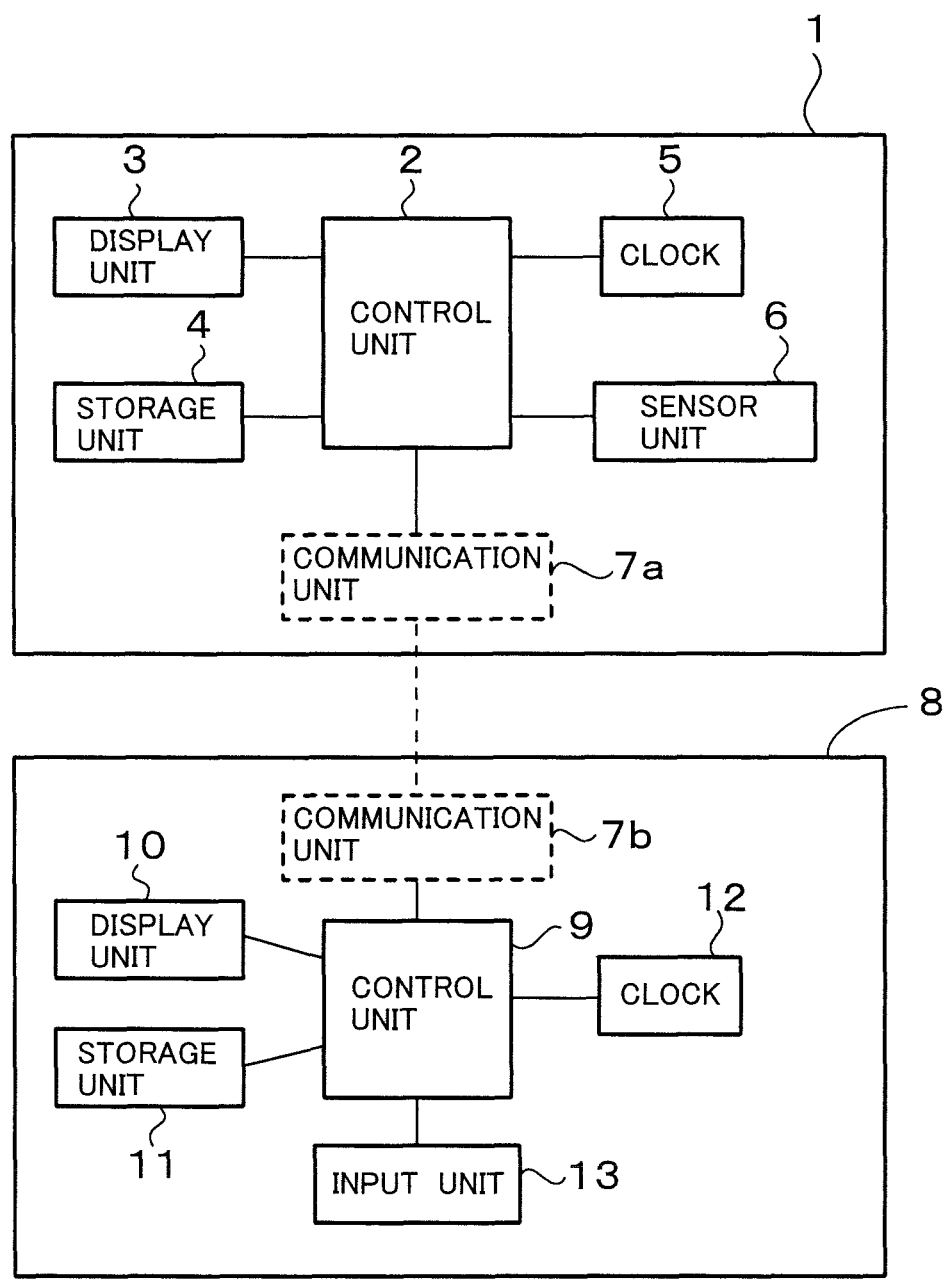
FIG. 2 is a diagram showing a system configuration of a specific example of an information display system including an embodiment of the information display terminal according to the present invention, and a central control terminal connected to the information display terminal.

FIG. 2 is a diagram showing a system configuration of a specific example of an information display system including an embodiment of the information display terminal according to the present invention, and a central control terminal connected to the information display terminal. The reference sign 1 denotes an information display terminal; 2 a control unit; 3 a display unit; 4 a storage unit; 5 a clock; 6 a sensor unit; 7a and 7b communication units; 8 a central control terminal; 9 a control unit; 10 a display unit; 11 a storage unit; 12 a clock; and 13 an input unit.

In FIG. 2, the information display terminal 1 including the control unit 2, the display unit 3, the storage unit 4, the clock 5, and the sensor unit 6 displays route guidance based on the concept explained using FIGS. 1A and 1B on the display unit 3, and the route guidance is stored in the storage unit 4. The route guidance is image information for guiding routes displayed on the display screen 100 explained using FIG. 1A, and is the walking human image 101 and an image displayed in the front region 102.

The control unit 2 controls each unit. The control unit 2 reads in necessary route guidance from the storage unit 4, processes the route guidance, prepares a route guidance image based on the concepts explained using FIGS. 1A and 1B, supplies the image to display unit 3 and makes the display unit 3 display it as shown in FIG. 1A.

The sensor unit 6 detects the traffic and the brightness of the space around the position where the information display terminal 1 is installed, and the control unit 2 adjusts a display mode of the route guidance image on the display unit 3 according to the detection results of the sensor unit 6. For example, when the traffic is high, the walking speed of the displayed human image 101 is made faster (FIG. 1A), and when it is dark, the display of the display screen 100 (FIG. 1A) is made brighter.

The clock 5 detects the time of a day, and based on the detected time of the clock 5, the control unit 2 controls timings to start and stop operations of the information display terminal 5, divides a day into predetermined time zones, and switches route guidance images on the display unit 3 according to the time zones.

The central control terminal 8 includes the communication unit 7b, the control unit 9, the display unit 10, the storage unit 11, the input unit 13, and the clock 12. The communication unit 7b is connected to the communication unit 7a of the information display terminal 1 through a network (not shown), enabling communication with the information display terminal 1. The network may either be wired or wireless.

Although the number of the information display terminal 1 shown here is one, the number of the information display terminal 1 connected to the central control terminal 8 is usually two or more, and the central control terminal 8 can communicate with each one of the information display terminals 1 through the network.

The storage unit 11 of the central control terminal 8 stores therein route guidance of each one of the information display terminals 1, and the control unit 9 reads in route guidance necessary for one of the information display terminals 1 from the storage unit 11, and supplies the route guidance to the information display terminal 1 at an appropriate timing. The clock 12 measures time, for example, by the time or by the day, and the control unit 9 detects the transition from one period to the next, for example from one season to the next, based on the measurement result of the clock 12, and transmits route guidance to any of the information display terminals 1 according to the detection result. When the information display terminal 1 receives the route guidance at the communication unit 7a, the information display terminal 1 stores the route guidance in the storage unit 4, and uses the route guidance as appropriate as described above to make the display unit 3 display the route guidance image.

The input unit 13 of the central control terminal 8 receives new route guidance to be added. When adding new route guidance image to any of the information display terminals 1, an operator uses the display unit 10 to input route guidance to be newly added to the information display terminal 1 through the input unit 13. The control unit 9 associates the input route guidance with the corresponding information display terminal 1 and stores it in the storage unit 11 along with operations of the input unit 13.

A specific example of a route guidance image displayed on the display screen of the display unit 3 in FIG. 2 is explained.

FIGS. 3A to 3E are diagrams showing specific examples of route guidance images displayed on the information display terminal 1 shown in FIG. 2. The reference signs 14 and 14a denote display screens; 15 a route guidance screen; 16 an action image; 16a a real human image; 16b a pseudo-human image; 16c a dot human image; 16d a line human image; 16e an animal image; and 17 a destination display information image. Parts that correspond to those in FIG. 2 are designated with the same reference signs, and they are not explained here again.

The specific examples in FIGS. 3A to 3E are cases where the information display terminal 1 is installed on a floor surface or a wall surface of a passage. The display screens 14 and 14a of the information display terminal 1 display the route guidance screen 15 including the action image 16 showing the motion of walking toward a destination and the destination display information image 17 that indicates the destination.

The image information of the action image 16 and the destination display information image 17 for each of the information display terminals 1, that is, the route guidance, is stored in the storage unit 11 in the central control terminal 8 in FIG. 2, and for example when the central control terminal 8 is activated every day at a predetermined time based on the time information of the clock 12, the control unit 9 reads in the route guidance corresponding to each of the information display terminal 1 from the storage unit 11, and transmits the route guidance to the information display terminal 1 together with activation command information. When the information display terminal 1 receives the activation command information, the control unit 2 is activated, and stores the route guidance in the storage unit 4. When it becomes, for example, an opening hour of a store or a station based on the time information of the clock 5, the control unit 2 reads in the necessary route guidance from the storage unit 4, prepares the route guidance screen 15 including the action image 16 and the destination display information image 17, and supplies the route guidance screen 15 to the display unit 3. Thereby, the display screen 14 of the display unit 3 displays the route guidance screen 15. The control unit 2 monitors the time based on the time information of the clock 5, and changes information displayed on the route guidance screen 15 at predetermined times.

The route guidance screen 15 is explained specifically.

FIG. 3A shows a liquid crystal display (LCD) screen as the display screen 14 of the display unit 3. The display screen 14 displays, as a route guidance image of the route guidance screen 15, an image of an actual human, that is, the real human image 16a as the action image 16 showing the walking motion, and the destination display information image (text image, in this case) 17 that represents a destination in a front region (corresponding to the front region 102 in FIG. 1A; the same applies hereinafter.) of the real human image 16a in the advancing direction. The text of the destination display information image 17 reads, in this case, "Subway Ticket Gate", and accordingly indicates that the destination "subway ticket gate" is located in the walking direction of the real human image 16a, that is, to the left of the display screen 14.

FIG. 3B also shows a LCD screen as the display screen 14 of the display unit 3. The display screen 14 displays, as a route guidance image of the route guidance screen 15, an image of a pseudo-human, that is, the pseudo-human image 16b as the action image 16 showing the walking motion, and the destination display information image (text image, in this case also) 17 that represents a destination in a front region of the pseudo-human image 16b in the advancing direction. The text of the destination display information image 17 also reads, in this case, "Subway Ticket Gate", and accordingly indicates that the destination "subway ticket gate" is located in the walking direction of the pseudo-human image 16b, that is, to the left of the display screen 14.

FIG. 3C shows the display unit 3 of a bulletin board type. The display screen 14a of the display unit 3 is a dot matrix display such as a LED. The display screen 14a displays, as a route guidance image of the route guidance screen 15, an image if a human depicted with dots, that is, the dot human image 16c as the action image 16 showing the walking motion, and the destination display information image (text image, in this case also) 17 that represents a destination in a front region of the dot human image 16c in the advancing direction. Again, the text of the destination display information image 17 reads "Exit", and accordingly the destination "exit" is located in the walking direction of the dot human image 16c, that is, to the left of the display screen 14.

FIG. 3D shows a LCD screen as the display screen 14a of the display unit 3. The display screen 14a displays, as a route guidance image of the route guidance screen 15, an image of a human depicted with lines, that is, the line human image 16d as the action image 16 showing the walking motion, and the destination display information image (text image, in this case also) 17 that represents a destination in a front region of the line human image 16d in the advancing direction. The text of destination display information image 17 reads, in this case, "Subway Ticket Gate", and accordingly the destination "subway ticket gate" is located in the walking direction of the line human image 16d, that is, to the left of the display screen 14.

FIG. 3E shows a LCD screen as the display screen 14a of the display unit 3. The display screen 14a displays, as a route guidance image of the route guidance screen 15, an image of an animal such as a dog, that is, the animal image 16e as the action image 16 showing the walking motion, and the destination display information image (text image, in this case also) 17 that represents a destination in a front region of the animal image 16e in the advancing direction. The text of the destination display information image 17 reads, in this case, "Subway Ticket Gate", and accordingly indicates that the destination "subway ticket gate" is located in the walking direction of the animal image 16e, that is, to the left of the display screen 14. The animal image 16e may be a real animal image as in the case of FIG. 3A or may be a pseudo-animal image, a dot animal image, or a line animal image as in the cases of FIGS. 3B, 3C, and 3D.

In this way, because the action image 16 shows the walking motion, it catches eyes of the user easily. Also because the destination display information image 17 that represents the destination is displayed in the front region of the action image 16 in the advancing direction, the destination display information image 17 is recognized at the same time the action image 16 is recognized, and the display screen 14 of the information display terminal 1 that displays the route guidance screen 15 of the destination that the user looks for can be found easily.

Figure 4A:
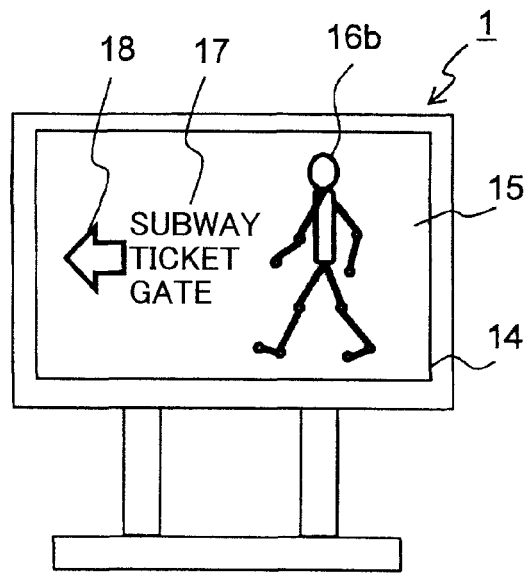
FIGS. 4A and 4B are diagrams showing other specific examples of route guidance images displayed on the information display terminal shown in FIG. 2.
Figure 4B:
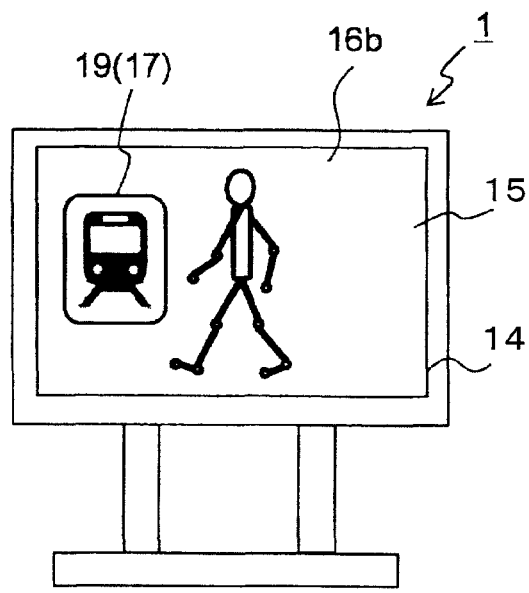

FIGS. 4A and 4B are diagrams showing other specific examples of the route guidance screen 15 displayed on the information display terminal 1 shown in FIG. 2. The reference sign 18 denotes an arrow, and 19 a pictogram. Parts that correspond to those in FIG. 3 are designated with the same reference signs, and they are not explained here again.

In the specific example shown in FIG. 4A, the arrow 18 that indicates the direction to the destination is added to the texts representing the destination as the destination display information image 17 in the specific examples shown in FIGS. 3A to 3E (In this case, the specific example of FIG. 3B is taken as an example.). The arrow is displayed next to the texts that represent the destination on the side of destination (in this case, to the left of the texts).

In the specific example shown in FIG. 4B, the destination display information image 17 is expressed with the pictogram 19 in the specific examples shown in FIGS. 3A to 3E (In this case also, the specific example of FIG. 3B is taken as an example.). In this example, the destination display information reads "Subway Ticket Gate", and the pictogram 19 as the destination display information image 17 represents the "subway ticket gate" with the picture of the subway. Similarly to the destination display information image 17 of texts, the pictogram 19 of course is displayed in the front region of the action image 16 (the pseudo-human image 16b in this case) in the advancing direction.

As can be seen, in these specific examples also, the action image 16 is displayed as the route guidance screen 15, and the destination display information image 17 including the arrow 18 and the pictogram 19 as the destination display information image 17 are displayed in the front region of the action image 16 in the advancing direction; thereby, effects same with those attained in the specific examples shown in FIGS. 3A to 3E can be attained.

Figure 5:
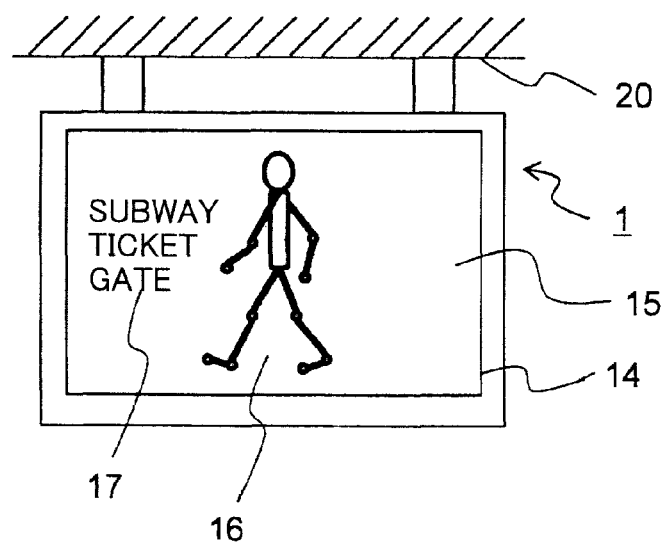
FIG. 5 is a diagram showing a specific example of a route guidance image displayed on the information display terminal that is installed in a different manner from that of the information display terminal shown in FIGS. 3A to 3E, 4A and 4B.

FIG. 5 is a diagram showing a specific example of the route guidance image 15 displayed on the information display terminal 1 that is installed in a different manner from that of the information display terminal 1 shown in FIGS. 3A to 3E, 4A and 4B. The reference sign 20 denotes a ceiling. Parts that correspond to those in FIGS. 3A to 3E, 4A and 4B are designated with the same reference signs, and they are not explained here again.

In FIG. 5, the information display terminal 1 is hung from a high place such as the ceiling 20, and the route guidance screen 15 displayed on the display screen 14 is the same with those shown in FIGS. 3A to 3E, 4A and 4B. Accordingly, effects same with those attained in the specific examples shown in FIGS. 3A to 3E, 4A and 4B can be attained.

FIGS. 6A and 6B are diagrams showing other specific examples of the route guidance images 15 showing guidance routes to directions different from those shown in the specific examples of FIGS. 3A to 3E, 4A, 4B, and 5. Parts that correspond to those in FIGS. 3A to 3E, 4A, 4B, and 5 are designated with the same reference signs, and they are not explained here again.

In FIG. 6A, the route guidance guides to go straight ahead. In this case, as the route guidance screen 15, the action image 16 shows the motion of walking straight ahead, and the destination display information image 17 is displayed on the upper part of the display screen 14 as if it is on the far side of the action image 16.

In FIG. 6B, the route guidance guides to go straight behind. In this case, as the route guidance screen 15, the action image 16 shows the motion of walking straight behind, and the destination display information image 17 is displayed on the lower part of the display screen 14 as if it is on the near side the action image 16.

In this way, effects same with those attained in the above-mentioned specific examples can be attained.

Figure 7:
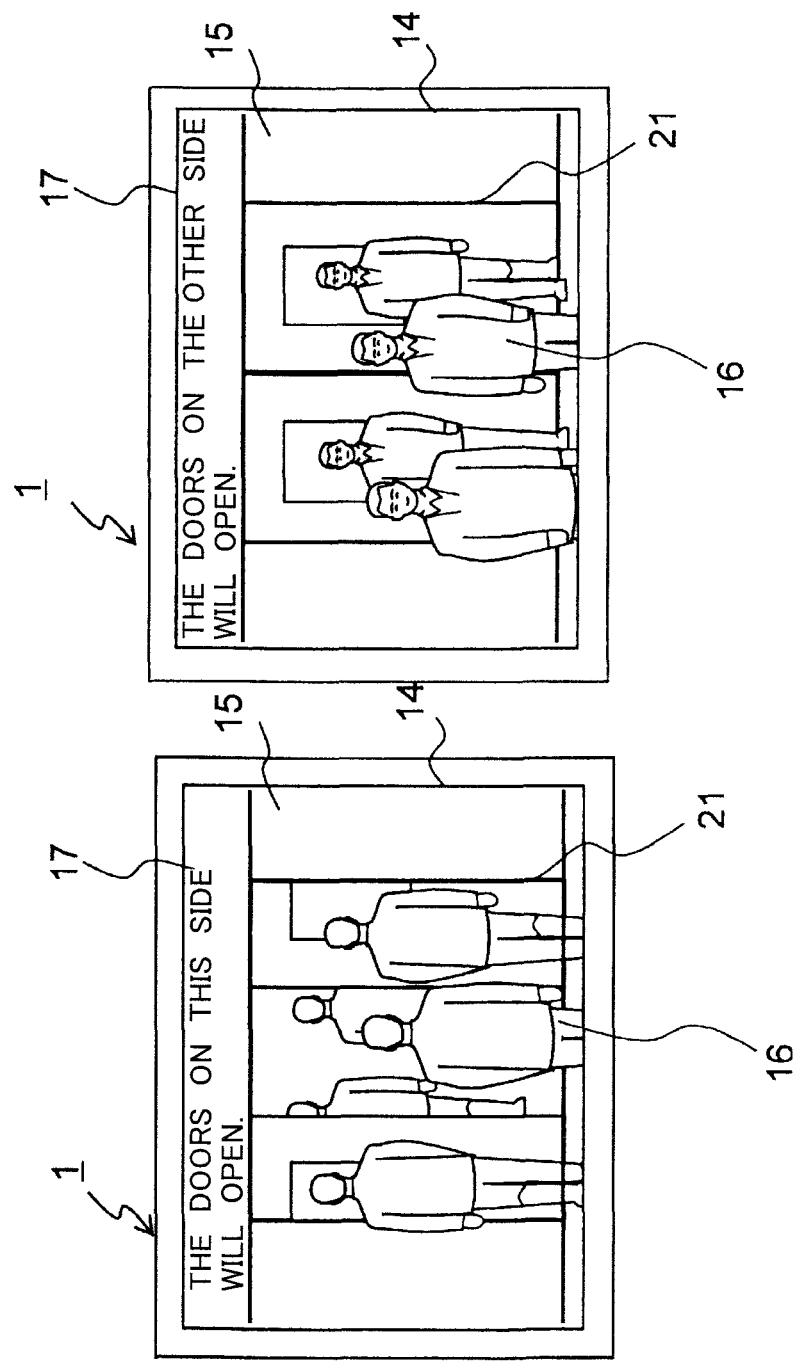
FIGS. 7A and 7B are diagrams showing specific examples of route guidance images displayed by an information display terminal installed at a train entrance/exit.

FIGS. 7A and 7B are diagrams showing specific examples of the route guidance images displayed by the information display terminal 1 installed at a train entrance/exit. The reference sign 21 denotes a door. Parts that correspond to those in the above-mentioned figures are designated with the same reference signs, and they are not explained here again.

In the specific example shown in FIG. 7A, the guidance route image guides that the door 21 on the side where the information display terminal device 1 is installed is to open, in a train arriving at a station. In this case, the route guidance screen 15 shows a plurality of the action images 16 walking out of the open door 21, and displays the destination display information image 17 reading a message such as "The doors on this side will open." above the door 21. In this case the destination is the platform of a next station.

In the specific example shown in FIG. 7B, the guidance route image guides that the door 21 on the side opposite to the side where the information display terminal 1 is installed is to open, in a train arriving at a station. In this case, the route guidance screen 15 shows a plurality of the action images 16 walking in the opposite direction of the door 21 that remains closed, and displays the destination display information image 17 reading a message such as "The doors on the other side will open." above the door 21. The destination display information image 17 may be displayed on the near side of the action images 16 on the lower part of the display screen 14.

In this way, effects same with those attained in the above-mentioned specific examples can be attained.

Figure 8:
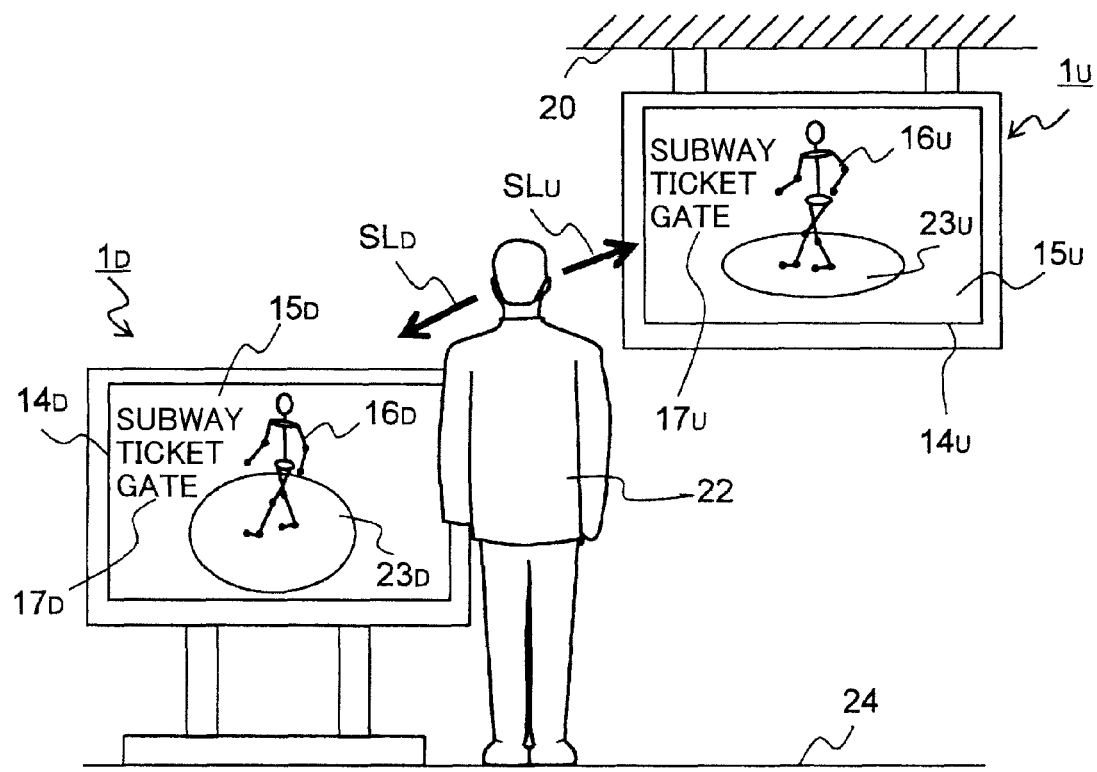
FIG. 8 is a diagram showing another display example that is different from the route guidance image displayed by the information display terminal shown in FIGS. 3A to 3E, 4A and 4B, and the route guidance image displayed by the information display terminal shown in FIG. 5.

FIG. 8 is a diagram showing another display example that is different from the route guidance image 15 displayed by the information display terminal 1 shown in 3A to 3E, 4A and 4B, and the route guidance image 15 displayed by the information display terminal 1 shown in FIG. 5. The reference sign $1_U$ denotes an upper information display terminal; $1_D$ a lower information display terminal; $14_U$ and $14_D$ display screens; $15_U$ and $15_D$ route guidance screens; $16_U$ and $16_D$ action images; $17_U$ and $17_D$ destination display information images; 22 a user; $23_U$ and $23_D$ circular regions; 24 a road surface; and $SL_U$ and $SL_D$ lines of sight. Parts that correspond to those in the above-mentioned figures are designated with the same reference signs, and they are not explained here again.

In FIG. 8, the upper information display terminal $1_U$ is the information display terminal 1 attached to the ceiling 20, and the lower information display terminal $1_D$ is the information display terminal 1 attached to the road surface 24.

The user 22 looks up at the display screen $14_U$ displaying the guidance screen $15_U$ of the upper information display terminal $1_U$ including the action image $16_U$ and the destination display information image $17_U$, and the line of sight $SL_U$ of the user 22 is obliquely upward. The display screen $14_U$ displays the circular region $23_U$, in which the action image $16_U$ on the route guidance screen $15_U$ shows the walking motion as explained above. The circular region $23_U$ is displayed as if it is looked up from obliquely below, like the user 22 looks up from obliquely below at the displayed action image $16_U$. In this case, the walking direction (i.e. the direction to the destination) can be shown by changing the direction of the action image $16_U$.

The user 22 looks down at the display screen $14_D$ displaying the guidance screen $15_D$ of the lower information display terminal $1_D$ including the action image $16_D$ and the destination display information image $17_D$, and the line of sight $SL_D$ of the user 22 is obliquely downward. The display screen $14_D$ displays the circular region $23_D$, in which the action image $16_D$ on the route guidance screen $15_D$ shows the walking motion as explained above. The circular region $23_D$ is displayed as if it is looked down from obliquely above, like the user 22 looks down from obliquely above at the displayed action image $16_D$. In this case, the walking direction can be shown by changing the direction of the action image $16_D$.

In this way, effects same with those attained in the above-mentioned specific examples can be attained, and the walking direction of the action image, accordingly the direction to the destination, can be shown more clearly.

Figure 9:
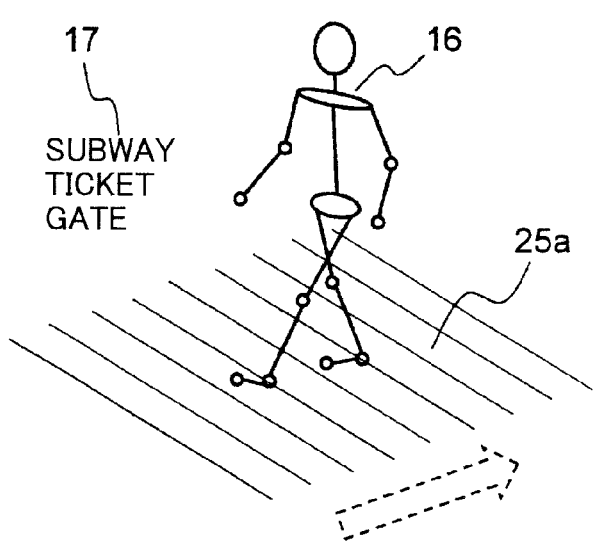
FIGS. 9A and 9B are diagrams showing modifications of the specific example of the route guidance image shown in FIG. 8.
Figure 9:
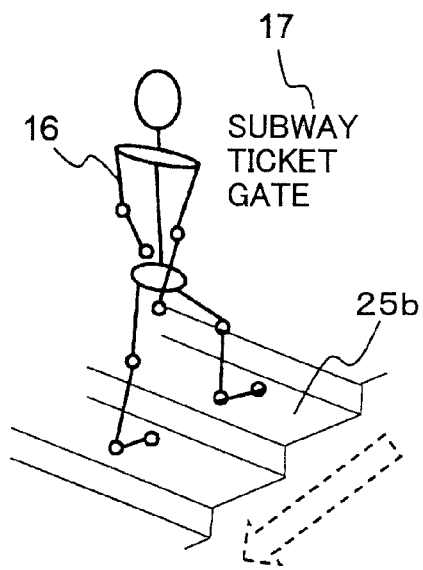

FIGS. 9A and 9B are diagrams showing modifications of the specific example of the route guidance image 15 shown in FIG. 8. The reference sign 25a denotes a floor surface image, and 25b a stair image. Parts that correspond to those in the above-mentioned figures are designated with the same reference signs, and they are not explained here again.

FIG. 9A shows the route guidance screen 15 in the case where the guidance route to the destination from the display information terminal 1 is on a floor surface, and the floor surface image 25a representing the floor surface is displayed. The floor surface image 25a moves in the opposite direction to the waking direction along with the walking motion of the action image 16. Thereby, although the action image 16 shows the walking motion, the display position on the display screen 14 does not change as in the above-mentioned specific examples. Also, the action image 16 is oriented to the direction to the destination as in the specific example shown in FIG. 8, and the floor surface image 25a is in the same way displayed to represent the direction. In addition, the floor surface image 25a is displayed as if it is looked up or down at as in the specific example shown in FIG. 8.

FIG. 9B shows the route guidance screen 15 in the case where the guidance route to the destination from the display information terminal 1 is stairs, and the stair image 25b representing the stairs is displayed. The stair image 25b is displayed as if it is looked up or down at as in the specific example shown in FIG. 8, and moves in the opposite direction to the walking direction of the action image 16 (the direction of going up the stair in this case) along with the walking motion of the action image 16. The action image 16 shows the motion of going up the sitars, but the display position does not change as in the above-mentioned specific examples. The action image 16 is oriented to the direction to the destination as in the specific example shown in FIG. 8, and the stair image 25b is in the same way displayed to represent the direction. The same applies to the case where the guidance route is to go down the stairs.

In these specific examples shown in FIGS. 9A and 9B, the guidance route screen 15 (the floor surface image 25a and the stair image 25b in these cases) may be displayed in the circular regions $23_U$ and $23_D$ shown in FIG. 8. Other than those explained above, the configuration is the same as those of the above-mentioned specific examples.

In this way, effects same with those attained in the above-mentioned specific examples can be attained, and the user 22 can recognize the type of the guidance route to the destination clearly, and grasp the route to the destination clearly.

FIGS. 10A and 10B are diagrams showing still other specific examples of the route guidance screen 15 displayed by the information display terminal 1 shown in FIGS. 1A and 1B. Parts that correspond to those in the above-mentioned figures are designated with the same reference signs, and they are not explained here again.

In this specific example, the route guidance screen 15 guides two destinations. The route guidance screen 15 shown in FIG. 10A and the route guidance screen 15 shown in FIG. 10B are displayed alternately every predetermined time.

Specifically, the information display terminal 1 is installed at a junction of routes to a "subway ticket gate" as one of the destinations and a "restroom" as the other, and guides the routes to both the destinations.

After the route guidance screen 15 shown in FIG. 10A is displayed on the display screen 14 for a predetermined length of time, the control unit 2 (FIG. 2) detects the elapse of time based on time information from the clock 5 (FIG. 2), reads in the route guidance of the route guidance screen 15 shown in FIG. 10B from the storage unit 4 (FIG. 2), prepares the route guidance screen 15, supplies it to the display unit 3 (FIG. 2), and makes the display unit 3 display it in place of the route guidance screen 15 shown in FIG. 10A. After the route guidance screen 15 shown in FIG. 10B is displayed for a predetermined length of time (equal to or different from the above-mentioned predetermined length of time), the control unit 2 in the same way prepares the route guidance screen 15 shown in FIG. 10A, and makes the display unit 3 display it.

Although the routes to the two different destinations are guided in this example, routes to three or more destinations may be guided by displaying three of more route guidance screens 15 alternately and repeatedly every predetermined time.

In this way, by repeating display operation based on time information from the clock 5, the information display terminal 1 can singly guide routes to a plurality of different destinations. The route guidance screen 15 is the same with those of the above-mentioned specific examples, and accordingly effects same with those attained in the above-mentioned specific examples can be attained.

FIGS. 11A and 11B are diagrams showing still other specific examples of the route guidance screen 15 displayed by the information display terminal 1 shown in FIGS. 1A and 1B. The reference signs 15a and 15b denote route guidance screens, and 26a and 26b displayed areas. Parts that correspond to those in the above-mentioned figures are designated with the same reference signs, and they are not explained here again.

Although these specific examples also show the route guidance screen 15 that guides to two destinations, but in this case, the route guidance screen 15 is displayed simultaneously.

In FIG. 11A, routes to different destinations for common users are guided. The display screen 14 of the information display terminal 1 is divided into a plurality (two in this case) of the displayed areas 26a and 26b, and the route guidance screens 15a and 15b for different destinations are displayed on the displayed area 26a and 26b. In this case, the route guidance screen 15a including the action image 16 and the destination display information image 17 that guide a route leftward to a subway ticket gate is displayed on the left displayed area 26a. The route guidance screen 15b including the action image 16 and the destination display information image 17 that guide a route rightward to a restroom is displayed on the right displayed area 26b. The manner of display of the action image 16 and the destination display information image 17 is the same with those of the above-mentioned specific examples.

In FIG. 11B, routes to different destinations located in different directions according to users are guided. In this case, the destinations are different for male and female users for example. The display screen 14 of the information display terminal 1 is divided into the displayed areas 26a and 26b for male and female users respectively for example. The displayed area 26a and the displayed area 26b display the route guidance screens 15a and 15b respectively for the destinations of the different users. In this example, the route guidance screen 15a including the action image 16 and the destination display information image 17 that guide a route leftward to a restroom for a male user located leftward is displayed on the left displayed area 26a, and the route guidance screen 15b including the action image 16 and the destination display information image 17 that guide a route rightward to a restroom for a female user located rightward is displayed on the right displayed area 26b. The manner of display of the action image 16 and the destination display information image 17 is the same with those of the above-mentioned specific examples, and in this case the action image 16 is the real human image 16a to distinguish male and female images.

Although the two destinations are guided each in the display screen 14 of FIGS. 11A and 11B, the route guidance screen 15 for three or more destinations may be displayed by using the information display terminal 1 having the horizontally long display screen 14.

As can be seen, in these specific examples, routes to a plurality of different destinations can be guided simultaneously with the single information display terminal 1. The route guidance screen 15 is the same with those of the above-mentioned specific examples, and accordingly effects same with those attained in the above-mentioned specific examples can be attained.

FIGS. 12A to 12D are diagrams showing still other specific examples of the route guidance screen 15 displayed by the information display terminal 1 shown in FIGS. 1A and 1B. The reference sign $15_S$ denotes a route guidance still-image screen; $15_M$ a route guidance motion image screen; $16_S$ an action still-image; and $16_M$ an action motion image. Parts that correspond to those in the above-mentioned figures are designated with the same reference signs, and they are not explained here again.

In this specific example, a route to a destination that is used in a specific situation such as an emergency exit is guided, and the information display terminal 1 shown in FIG. 2 includes the sensor unit 6 that detects the specific situation. The storage unit 4 stores therein information of the route guidance screen 15 for the usual situation, and information of the route guidance screen 15 for the specific situation. The control unit 2 reads out information according to a detected situation from the storage unit 4 according to detection result of the sensor unit 6, prepares the route guidance screen 15, and makes the display unit 3 display it.

In this specific example, a route to an emergency exit as the destination is guided.

Figure 12:
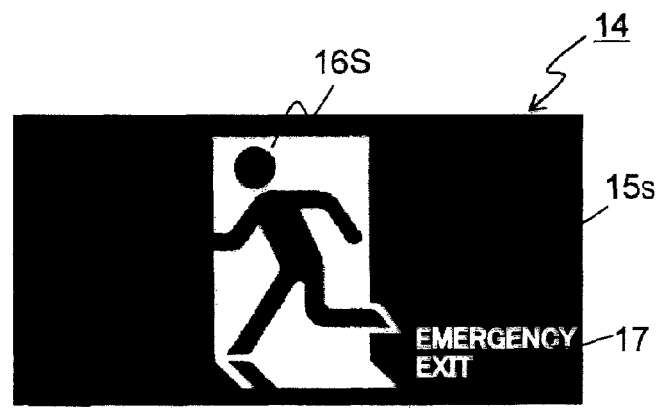
FIGS. 12A to 12D are diagrams showing still other specific examples of the route guidance screen displayed by the information display terminal shown in FIGS. 1A and 1B.
Figure 12:
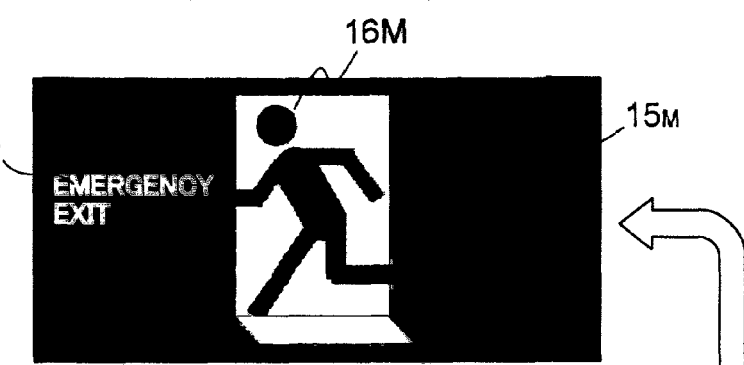
Figure 12:
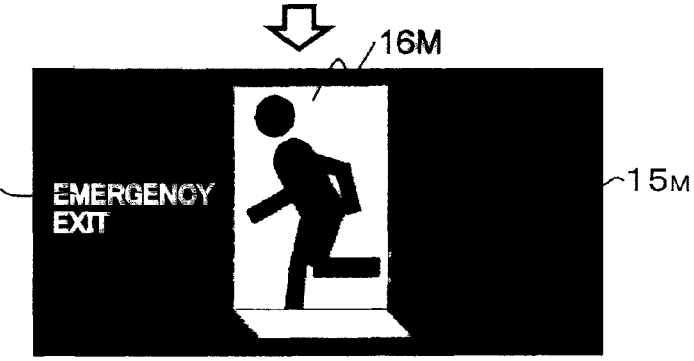
Figure 12:
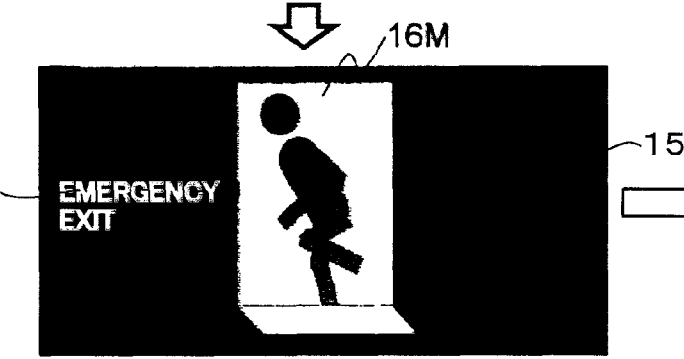

FIG. 12A shows the route guidance still-image screen $15_S$ that is displayed on the display screen 14 in the usual situation (normal situation). The action still-image $16_S$ showing the running motion is displayed as the still image, and the destination display information image 17 is displayed in the opposite direction to the running direction of the action still-image $16_S$, that is, behind the action image $16_S$.

When an abnormal situation when the emergency exit needs to be used occurs, the route guidance motion image screen $15_M$ is displayed on the display screen 14 in the order of FIGS. 12B, 12C, and 12D repeatedly. In this case, the action motion image $16_M$ is running or legging and shows the running or legging states in the order of FIGS. 12B, 12C, and 12D. As in the above-mentioned specific examples, the display position of the action motion image $16_M$ is a predetermined position on the display screen 14, for example the center, and the destination display information image 17 is displayed in front of the action motion image $16_M$.

Accordingly, effects same with those attained in the above-mentioned specific examples can be attained about the route guidance to a destination such as an emergency exit.

Figure 13A:
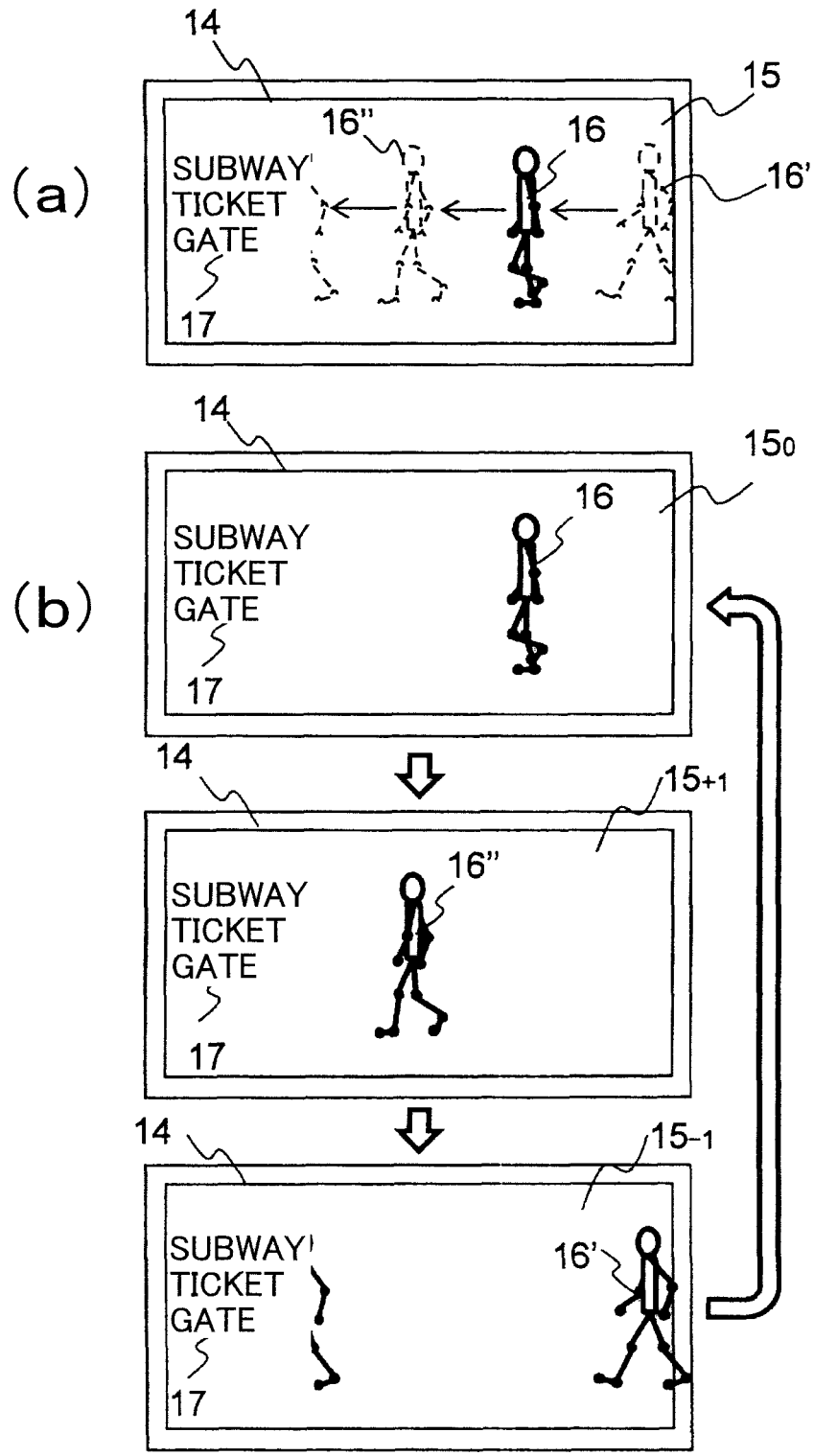
FIG. 13A is a diagram showing still another example of the route guidance screen displayed by the information display terminal shown in FIGS. 1A and 1B.
Figure 13B:
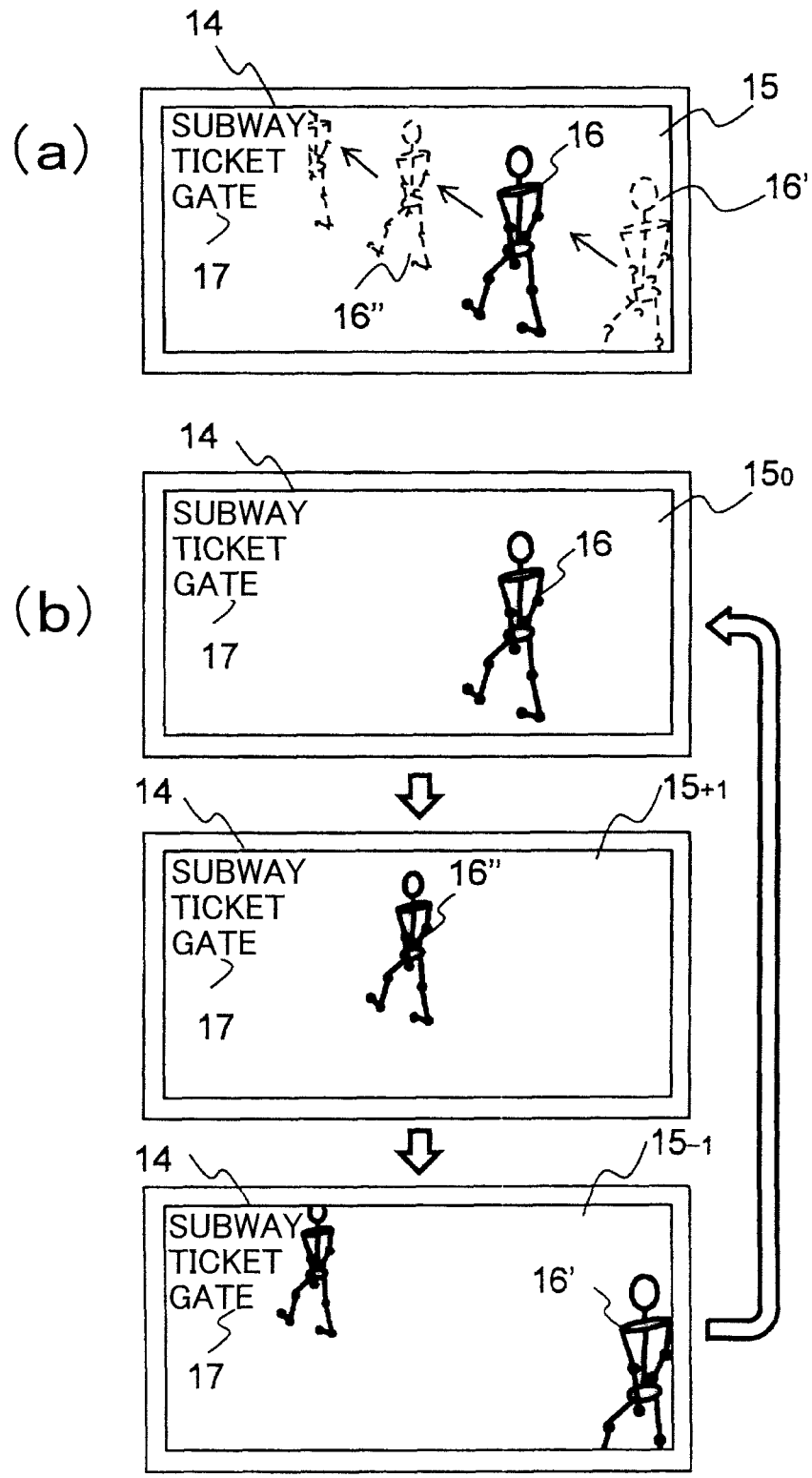
FIG. 13B is a diagram showing another example of the route guidance screen displayed on the information display terminal that displays the route guidance screen shown in FIG. 13A.

FIGS. 13A to 13C are diagrams showing still other examples of the route guidance screen 15 displayed by the information display terminal 1 shown in FIGS. 1A and 1B. The reference signs 16' and 16" denote action images. Parts that correspond to those in the above-mentioned figures are designated with the same reference signs, and they are not explained here again.

In the specific example shown in FIG. 13A, the route guidance screen 15 shows the destination located leftward from the current position (the position where the information display terminal 1 is installed, and in this case, the right end of the display screen 14). (a) of FIG. 13A shows the action image 16 walking to move leftward as indicated by an arrow. The action image 16 depicted with solid lines indicates the position and state of the action image after walking several steps from the current position at the current time. The action image 16' depicted with dashed lines at the right end of the display screen 14 to the right of the action image 16 indicates the position and state of the action image before the current time. The action image 16" depicted with dashed lines shown to the left of the action image 16 shows the position and state of the action image after walking further several steps from the position of the action image 16 after the current time.

The destination display information image 17 is displayed at the end of the display screen 14 in front of the action image 16, and when the action image 16 advances to hide behind the destination display information image 17, the action image 16 appears again from the right side of the display screen 14 (current position), and walks leftward.

(b) of FIG. 13A shows the route guidance screen 15 at each moment of the route guidance screen 15 shown in (a) of FIG. 13A. In (b) of FIG. 13A, a route guidance screen $15_{-1}$ indicates the route guidance screen 15 before the current time of (a) of FIG. 13A. A route guidance screen $15_0$ indicates the route guidance screen 15 after walking several steps after the current time of (a) of FIG. 13A. A route guidance screen $15_{+1}$ indicates the route guidance screen 15 after the current time of (a) of FIG. 13A.

The route guidance screen 15 showing the positions and states of the action image 16 corresponding to those at moments between those of the route guidance screens $15_0$, $15_{+1}$ and $15_{-1}$ are also displayed, but in this example, only the route guidance screens $15_0$, $15_{+1}$ and $15_{-1}$ are shown as representatives.

With the route guidance screens $15_0$, $15_{+1}$ and $15_{-1}$ displayed in this order repeatedly, the route guidance screen 15 displays the walking and moving action image 16 shown in (a) of FIG. 13A.

Although in this specific example, because the action image 16 moves leftward to the destination located to the left, the position on the display screen 14 corresponding to the position where the information display terminal 1 is installed is the right end of the display screen 14, the position on the display screen 14 corresponding to the position where the information display terminal 1 is installed is the left end of the display screen 14 when the action image 16 moves rightward to the destination located to the right.

The specific example shown in FIG. 13B shows the route guidance screen 15 in the case where the destination is located diagonally to the left seen from the current position. As shown in (a) of FIG. 13B, the action image 16 is a motion image and is displayed to walk to move diagonally to the left as indicated by an arrow. In this case, the action image 16 is displayed oriented to its advancing direction (diagonally to the upper left on the display screen 14). In this example, the action image 16 depicted with solid lines indicates the position and state of the action image after walking several steps from the current position at the current time. The action image 16' to the right of the action image 16 indicates the position and state of the action image before the current time. The action image 16" to the left of the action image 16 indicates the position and state of the action image after the current time, after the action image 16 walks further several steps. In this case, the right action image 16' is displayed larger than the action image 16 as it is currently on the near side of the action image 16 in the advancing direction, and the left action image 16" is displayed smaller than the action image 16 as it is on the far side of the action image 16 in the advancing direction.

The destination display information image 17 is displayed at the end of the display screen 14 in front of the action image 16 in the advancing direction (in this case the upper left corner of the display screen 14). When the action image 16 advances to hide behind the destination display information image 17, the action image 16' advancing from the right side of the display screen 14 at the current position appears again to walk leftward.

(b) of FIG. 13B shows the route guidance screen 15 at each moment of the route guidance screen 15 shown in (a) of FIG. 13B. In (b) of FIG. 13B, the route guidance screen $15_{-1}$ indicates the route guidance screen 15 when the action image 16' is at the current position before the current time of (a) of FIG. 13B. The route guidance screen $15_0$ indicates the route guidance screen 15 at the current time of (a) of FIG. 13B. The route guidance screen $15_{+1}$ indicates the route guidance screen 15 after the current time of (a) of FIG. 13B.

The route guidance screen 15 showing positions and states of the action image 16 corresponding to those at moments between those of the route guidance screens $15_0$, $15_{+1}$ and $15_{-1}$ are also displayed, but in this example, only the route guidance screens $15_0$, $15_{+1}$ and $15_{-1}$ are shown as representatives.

With the route guidance screens $15_0$, $15_{+1}$ and $15_{-1}$ displayed in this order repeatedly, the route guidance screen 15 displays the walking and moving action image 16 shown in (a) of FIG. 13B.

Although in this specific example, because the action image 16 moves diagonally to the left to the destination located diagonally to the left, the position on the display screen 14 corresponding to the position where the information display terminal 1 is installed is the right end of the display screen 14, the position on the display screen 14 corresponding to the position where the information display terminal 1 is installed is the left end of the display screen 14 when the action image 16 moves diagonally to the right to the destination located diagonally to the right.

The specific example shown in FIG. 13C shows the route guidance screen 15 in the case where the route to the destination is leftward and then diagonally to the left seen from the current position. As shown in (a) of FIG. 13C, the action image 16 is a motion image and is displayed to walk to move leftward and then diagonally to the left as indicated by an arrow. In this case, the action image 16 is displayed oriented to its advancing direction (leftward on the display screen 14), and when it starts advancing diagonally to the leftward, is oriented to the direction. In this example, the action image 16 depicted with solid lines indicates the position and state of the action image after walking a certain distance from the current position at the current time. The action image 16' to the right of the action image 16 indicates the position and state of the action image before the current time. The action image 16" to the left of the action image 16 indicates the position and state of the action image after the current time, after the action image 16 walks several steps. In this case, the action images 16' and 16 from the current position to the current time both are oriented leftward and are same in size, but the action image 16" to the left of the action image 16 is displayed smaller than the action images 16' and 16 and is oriented diagonally to the left because the action image 16" is advancing diagonally to the left. The action image 16 becomes smaller as it advances diagonally to the left.

The destination display information image 17 is displayed at the end of the display screen 14 in front of the action image 16 in the advancing direction, and further is displayed to correspond to the advancing direction of the action image 16 (in this case, the upper left corner of the display screen 14).

When the action image 16 advances to hide behind the destination display information image 17, the action image 16' appears again from the right side of the display screen 14 to walk leftward. The destination display information image 17 may be displayed at the end of the display screen 14 when the action image 16 advances leftward, and, when the advancing direction of the action image 16 changes to diagonally upward, the display position of the destination display information image 17 may be changed to the advancing direction of the action image 16, that is, to the upper left corner of the display screen 14.

(b) of FIG. 13C shows the route guidance screen 15 at each moment of the route guidance screen 15 shown in (a) of FIG. 13C. In (b) of FIG. 13C, the route guidance screen $15_{-1}$ indicates the route guidance screen 15 at the current position before the current time of (a) of FIG. 13C. The route guidance screen $15_0$ indicates the route guidance screen 15 at the current time of (a) of FIG. 13C. The route guidance screen $15_{+1}$ indicates the route guidance screen 15 after the current time of (a) of FIG. 13C after the advancing direction has changed. When the action image 16" advances to hide behind the destination display information image 17, the route guidance screen $15_{-1}$ is displayed in which the action image 16' appears from the right side of the display screen 14 at the position corresponding to the current position.

The route guidance screen 15 showing positions and states of the action image 16 corresponding to those at moments between those of the route guidance screens $15_0$, $15_{+1}$ and $15_{-1}$ are also displayed, but in this example, only the route guidance screens $15_0$, $15_{+1}$ and $15_{-1}$ are shown as representatives.

With the route guidance screens $15_0$, $15_{+1}$ and $15_{-1}$ displayed in this order repeatedly, the route guidance screen 15 displays the walking and moving action image 16 shown in (a) of FIG. 13C.

In the specific examples shown in FIGS. 13A to 13C, because the destination display information image 17 is displayed, together with the action image 16 that shows the walking motion, in front of the action image 16 in the advancing direction, effects same with those attained in the above-mentioned specific examples can be attained. Furthermore, because the action image 16 is displayed as if it is actually walking to move, it catches eyes of the user more, and attracts the user's attention easily.

In this example, the position on the display screen 14 corresponding to the position where the information display terminal 1 is installed is either the left end or the right end of the display screen 14 according to the movement direction of the action image 16 as in the other examples.

Figure 14:
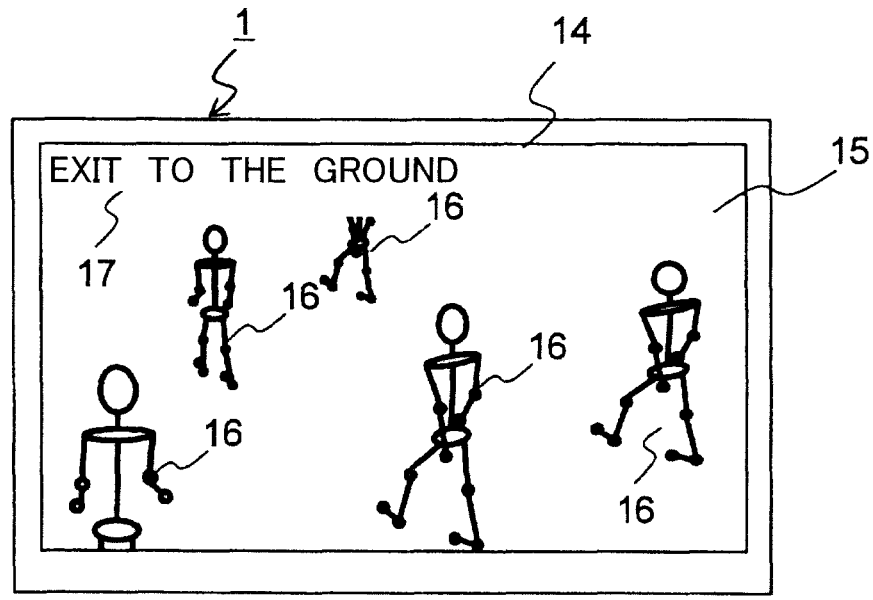
FIG. 14 is a diagram showing still another specific example of the route guidance screen displayed by the information display terminal shown in FIGS. 1A and 1B.

FIG. 14 is a diagram showing still another specific example of the route guidance screen 15 displayed by the information display terminal 1 shown in FIGS. 1A and 1B. Parts that correspond to those in the above-mentioned figures are designated with the same reference signs, and they are not explained here again.

In this specific example, as in the specific example shown in FIGS. 13A to 13C, the route guidance screen 15 displays the destination display information image 17 at the end of the display screen 14 in the direction from the current position, and the action image 16 walks to move toward the destination. But this specific example is different from the specific example shown in FIGS. 13A to 13C in that a plurality of the action images 16 all move toward the display position of the destination display information image 17. In this case, each of the action images 16 becomes smaller in size as they go away from the position on the display screen 14 corresponding to the current position.

In this way, in this specific example, effects same with those attained in the specific examples shown in FIGS. 13A to 13C can be attained. In addition to them, because a large number of the action images 16 are displayed to move toward the destination all together, the destination display information image 17 catches eyes of the user more, and it becomes easier to recognize the route to the destination.

In this specific example, the position on the display screen 14 corresponding to the position where the information display terminal 1 is installed (the current position in the above explanation) is the position on the display screen 14 as the route guidance screen 15 displayed on the display screen 14 is shown in a three-dimensional space from the position corresponding to the display screen 14. Accordingly, the action image 16 displayed at the current position is displayed the largest, and becomes smaller as it goes away from the position.

In the route guidance screen 15 in any of the above-mentioned specific examples, the motion speed of the action image 16 (e.g. walking speed) may be changed according to the detection results of the clock 5 and the sensor unit 6 in FIG. 2. For example, when the traffic is high such as rush hours (e.g. commuting rush hours) and holidays, the motion speed of the action image 16 is made faster to guide users to advance faster, and in time zones such as around the noon when users are mostly the elderly and shoppers, the motion speed of the action image 16 is made slower to guide users to walk slowly.

The information display terminal 1 that displays the route guidance screen 15 is explained above to be installed in a passage of a store or a station yard; however, the information display terminal 1 may be a terminal such as a cellular phone and a mobile terminal.

Figure 15:
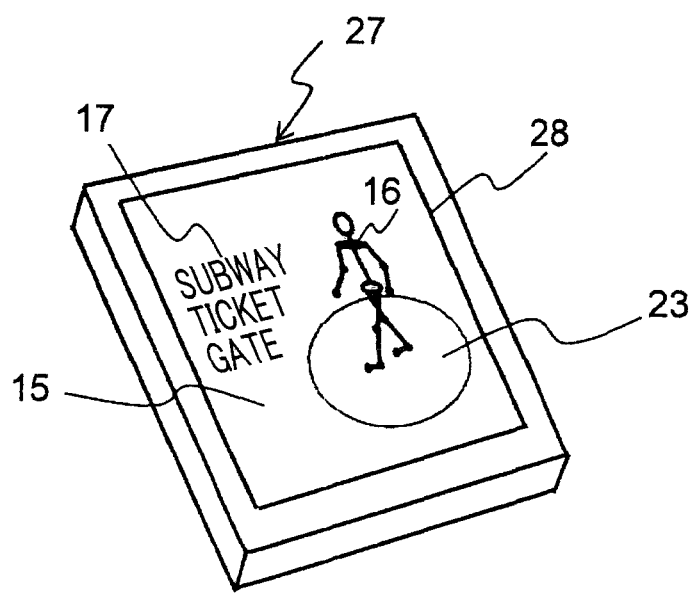
FIG. 15 is a diagram showing a specific example of the route guidance screen displayed by a mobile terminal as the information display terminal shown in FIG. 2.

FIG. 15 is a diagram showing the route guidance screen 15 displayed on a display screen 28 of a route guidance terminal 27 displayed on a mobile terminal. The route guidance screen 15 displays what the route guidance screen $15_D$ shown in FIG. 8 displays. However, the display of the route guidance screen 15 may be any of those of the above-mentioned specific examples or others.

In the case where the information display terminal 1 shown in FIG. 2 is the mobile terminal 27, when the mobile terminal 27 enters a service area of the route guidance to be activated and operated to receive the services, the mobile terminal 27 is provided with a program to receive the services from the central control terminal 8 and route guidance, and can receive the services accordingly.

In this case, in the mobile terminal 27, the storage unit 4 stores therein the provided route guidance, the sensor 6 detects the position and direction of the mobile terminal 27, the clock 5 detects the time, and the control unit 2 is activated based on the provided program, reads in, from the storage unit 4, route guidance that correspond to the current position and direction of the mobile terminal 27 and the time based on the detection results of the sensor unit 6 and the clock 5, prepares a route guidance screen, and supplies it to the display unit 3. Thereby, the display screen 28 of the mobile terminal 27 displays the route guidance screen 15 as shown in FIG. 15. In this example, the display screen 28 displays the route guidance screen 15 according to the position and direction of the mobile terminal 27 in a passage where the guidance service is provided. For example, when a user holding the mobile terminal 27 in a state as shown in FIG. 15 turns around, the relationship between display positions of the action screen 16 and the destination display information image 17 on the route guidance screen 15 is reversed, and accordingly the action screen 16 is turned around.

In this way, the mobile terminal 27 can display the route guidance screen 15 same with that of the information display terminal 1 installed in the passage.

What is claimed is:

1. An information display terminal having a display screen that displays a route guidance screen for guiding a route to a destination,
   wherein: the route guidance screen displays an action image showing the motion of walking in a direction to the destination, and a destination display information image that represents a destination name; and
   the destination display information image is displayed in a region next to the action image in a moving direction of the action image.

2. The information display terminal according to claim 1, wherein the action image shows the motion of walking at a constant display position on the display screen.

3. The information display terminal according to claim 1, wherein the route guidance screen shows a state as if the action image looks up or down according to a height of the display screen.

4. The information display terminal according to claim 1, wherein: the route guidance screen displays the action image walking along a passage; and
   the passage is displayed to move in an opposite direction to the walking direction of the action image.

5. The information display terminal according to claim 1, wherein the display screen displays a plurality of the route guidance screens that are different for different guidance destinations in an order repeatedly every predetermined time.

6. The information display terminal according to claim 1, wherein the display screen displays, simultaneously in different areas, a plurality of the route guidance screens that are different for different guidance destinations.

7. The information display terminal according to claim 1, wherein the route guidance screen displays the action image that is a still image at a normal situation, and the action image showing the motion of walking at an abnormal situation.

8. The information display terminal according to claim 1, wherein the action image walks to move toward a display position of the destination display information image on the display screen.

9. The information display terminal according to claim 8, wherein the action image is displayed oriented in different directions according to movement directions.

10. The information display terminal according to claim 8, wherein the action image is displayed to change in size as it moves.

11. The information display terminal according to claim 8, wherein the route guidance screen displays a plurality of the action images walking to move toward a display position of the destination display information image.

12. The information display terminal according to claim 1, that is a mobile terminal.

13. The information display terminal according to claim 1, further comprising a sensor unit that detects traffic and brightness of a space around a position where the information display terminal is installed, wherein a display mode of the route guidance screen on the display screen is adjusted according to a detection result of the sensor unit.

14. The information display terminal according to claim 1, further comprising a clock unit that detects time of a day, wherein based on a detected time of the clock, the route guidance screens on the display screen are switched.

15. The information display terminal according to claim 13, further comprising a clock unit that detects time of a day, wherein based on a detected time of the clock, the route guidance screens on the display screen are switched.

* * * * *